US012359977B1

(12) United States Patent
DeSantis et al.

(10) Patent No.: US 12,359,977 B1
(45) Date of Patent: Jul. 15, 2025

(54) PHASE CORRECTION FOR OPTICAL INTERFEROMETRIC IMAGING

(71) Applicant: Lockheed Martin Corporation, Bethesda, MD (US)

(72) Inventors: Zachary James DeSantis, Highlands Ranch, CO (US); Lawton Hubert Lee, Fremont, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 470 days.

(21) Appl. No.: 17/539,296

(22) Filed: Dec. 1, 2021

Related U.S. Application Data

(60) Provisional application No. 63/226,820, filed on Jul. 29, 2021.

(51) Int. Cl.
*G01J 9/02* (2006.01)
*G01B 9/02* (2022.01)

(52) U.S. Cl.
CPC ............ *G01J 9/02* (2013.01); *G01B 9/02044* (2013.01); *G01J 2009/028* (2013.01)

(58) Field of Classification Search
CPC .............. G01B 9/02091; G01B 9/0209; G01B 9/02004; G01B 11/2441; G01B 2290/70;
(Continued)

(56) References Cited

U.S. PATENT DOCUMENTS

| 5,108,168 | A | * | 4/1992 | Norbert | ................. | G02B 23/00 |
|  |  |  |  |  |  | 359/429 |
| 5,208,654 | A | * | 5/1993 | Shao | ....................... | G01S 17/87 |
|  |  |  |  |  |  | 356/498 |

(Continued)

FOREIGN PATENT DOCUMENTS

| CN | 111562000 A | * | 8/2020 | ............ G01J 3/0243 |
| WO | WO-2004011963 A2 | * | 2/2004 | ............. G01J 3/453 |
| WO | WO-2018051145 A2 | * | 3/2018 | |

OTHER PUBLICATIONS

Desantis, Z. J.; Thurman, S. T.; Hix, T. T.; Ogden, C. E., "Image Reconstruction from Data Collected with an Imaging Interferometer," 2017 Advanced Maui Optical and Space Surveillance Technologies Conference (AMOS)—www.amostech.com (Year: 2017).*

(Continued)

*Primary Examiner* — Michael P Stafira

(57) ABSTRACT

Provided herein are various enhancements for processing interference fringe data produced by optical interferometry and producing images from such interference fringe data. One example implementation includes a method comprising producing an interference fringe image by interfering multispectral optical signals of a scene supplied by optical collection devices. The method includes transforming the interference fringe image into a frequency domain representation comprising spectral channels corresponding to interfered combinations among the multispectral optical signals, determining pathlength errors of beam paths associated with the optical collection devices by concurrently processing the spectral channels of the frequency domain representation, and removing the pathlength errors in the frequency domain representation to produce a corrected frequency domain representation. The method also includes constructing a corrected image of the scene from visibility samples arising from the corrected frequency domain representation.

9 Claims, 7 Drawing Sheets

(58) Field of Classification Search
CPC ........... G01B 9/02044; G01B 9/02084; G01B 2290/45; G01B 9/02083; G01B 9/02057; G01B 9/02072; G01B 9/02; G01B 9/02027; G01B 11/0675; G01B 9/02007; G01B 9/02002; G01B 9/02069; G01B 9/0201; G01B 9/02032; G01B 9/02043; G01B 11/06; G01B 9/02047; G01B 9/02081; G01B 9/02075; G01B 9/02087; G01B 9/02028; G01B 9/04; G01B 9/0203; G01B 11/14; G01B 9/02088; G01B 11/0608; G01B 9/02077; G01B 11/24; G01B 9/0207; G01B 9/02078; G01B 9/02079; G01B 2210/56; G01B 9/02039; G01B 9/02068; G01B 9/02063; G01B 9/02014; G01B 9/02008; G01B 9/02022; G01B 11/02; G01B 11/30; G01B 11/306; G01B 9/02067; G01B 11/0683; G01B 2290/60; G01B 9/02019; G01B 9/02058; G01B 9/02005; G01B 9/02021; G01B 9/02045; G01B 2290/25; G01B 9/02011; G01B 9/02097; G01B 2290/35; G01B 11/00; G01B 11/026; G01B 2290/65; G01B 2290/20; G01B 11/0625; G01B 2290/30; G01B 9/02015; G01B 9/02041; G01B 9/02074; G01B 9/02076; G01B 11/0633; G01B 11/18; G01B 11/22; G01B 9/02065; G01B 9/02029; G01B 9/021; G01B 2290/50; G01B 9/02003; G01B 9/02085; G01B 9/02042; G01B 9/02048; G01B 9/0205; G01B 9/023; G01B 11/0616; G01B 11/161; G01B 11/25; G01B 9/02038; G01B 9/02024; G01B 9/02059; G01B 11/16; G01B 9/02055; G01B 9/02082; G01B 11/0658; G01B 11/245; G01B 9/02035; G01B 11/002; G01B 9/02012; G01B 9/02025; G01B 11/254; G01B 11/26; G01B 11/272; G01B 9/02049; G01B 2290/15; G01B 9/02016; G01B 11/303; G01B 9/02056; G01B 9/02064; G01B 11/005; G01B 11/007; G01B 11/0666; G01B 9/02001; G01B 2210/60; G01B 9/02034; G01B 9/02062; G01B 9/02071; G01B 9/02089; G01B 11/168; G01B 9/02009; G01B 9/02018; G01B 9/02061; G01B 11/105; G01B 11/162; G01B 9/02023; G01B 11/2527; G01B 21/042; G01B 2290/40; G01B 9/02017; G01B 9/02037; G01B 9/02051; G01B 11/2518; G01B 11/27; G01B 21/085; G01B 21/12; G01B 5/10; G01B 7/125; G01B 11/2408; G01B 15/00; G01B 21/32; G01B 9/025; G01B 9/08; G01B 11/03; G01B 11/2504; G01B 11/2513; G01B 21/045; G01B 2210/52; G01B 2290/55; G01B 9/06; G01B 11/022; G01B 11/2545; G01B 11/255; G01B 15/06; G01B 2210/306; G01B 5/02; G01B 7/004; G01B 7/16; G01B 9/02036; G01B 9/02054; G01B 9/02094; G01B 9/02096; G01B 11/0641; G01B 11/08; G01B 11/12; G01B 11/165; G01B 11/2416; G01B 11/2509; G01B 15/02; G01B 17/08; G01B 21/00; G01B 21/20; G01B 2290/10; G01B 3/30; G01B 5/28; G01B 7/34; G01B 9/00; G01B 9/02095; G01J 3/45; G01J 3/453; G01J 9/02; G01J 11/00; G01J 3/0218; G01J 9/0215; G01J 3/02; G01J 3/0208; G01J 3/021; G01J 3/0264; G01J 3/2823; G01J 3/18; G01J 9/00; G01J 3/28; G01J 3/42; G01J 3/26; G01J 3/4531; G01J 3/0205; G01J 3/0289; G01J 3/14; G01J 3/4406; G01J 2003/1861; G01J 3/10; G01J 3/2803; G01J 3/0224; G01J 3/447; G01J 9/0246; G01J 2003/4538; G01J 2009/0265; G01J 3/433; G01J 3/0229; G01J 3/0286; G01J 3/0297; G01J 3/4338; G01J 2003/2866; G01J 2003/451; G01J 2003/423; G01J 3/0256; G01J 3/0294; G01J 1/00; G01J 2003/4334; G01J 2009/002; G01J 2009/0226; G01J 3/00; G01J 5/0806; G01J 3/108; G01J 5/00; G01J 5/0003; G01J 5/0275; G01J 5/0803; G01J 5/0846; G01J 5/60; G01J 5/80; G01J 1/4257; G01J 2003/1828; G01J 2005/583; G01J 3/0243; G01J 3/12; G01J 3/1804; G01J 3/4535; G01J 5/0896; G01J 5/10; G01J 2009/0249; G01J 2009/0292; G01J 3/027; G01J 3/44; G01J 3/501; G01J 3/508; G01J 3/513; G01J 5/58; G01J 2003/1226; G01J 2003/2806; G01J 2009/0211; G01J 3/1809; G01J 4/04; G01J 1/42; G01J 2003/452; G01J 2009/0219; G01J 3/0248; G01J 3/0259; G01J 3/1838; G01J 5/59; G01J 1/0414; G01J 2001/4261; G01J 2003/1208; G01J 2003/1239; G01J 2003/4332; G01J 2009/0238; G01J 2009/0284; G01J 3/0213; G01J 3/0216; G01J 3/0232; G01J 3/04; G01J 3/08; G01J 3/4532; G01J 1/02; G01J 1/0429; G01J 2001/4247; G01J 2003/2859; G01J 2003/2879; G01J 2009/0234; G01J 3/22; G01J 3/462; G01J 4/00; G01J 5/0014; G01J 1/08; G01J 2001/4238; G01J 2001/4266; G01J 2003/425; G01J 2005/0077; G01J 2005/123; G01J 2009/0288; G01J 3/0202; G01J 3/0291; G01J 3/457; G01J 3/50; G01J 5/03; G01J 5/0853; G01J 5/532; G01J 1/0425; G01J 1/0477; G01J 1/4228; G01J 2001/446; G01J 2003/106; G01J 2003/1204; G01J 2003/1213; G01J 2003/1247; G01J 2003/1278; G01J 2003/467; G01J 2009/006; G01J 3/0237; G01J 3/0245; G01J 3/06; G01J 3/4537; G01J 3/502; G01J 3/51; G01J 5/0044; G01J 5/0804; G01J 5/0808; G01J 5/0821; G01J 5/0831; G01J 5/52; G01J 7/00; G01J 2009/028

See application file for complete search history.

(56) References Cited

U.S. PATENT DOCUMENTS

| | | | | | |
|---|---|---|---|---|---|
| 5,923,278 | A | * | 7/1999 | Poehler | ............... G01S 13/9019 342/25 C |
| 6,011,505 | A | * | 1/2000 | Poehler | ............... G01S 13/9019 342/25 C |
| 6,046,695 | A | * | 4/2000 | Poehler | ............... G01S 13/9019 342/25 A |

(56) References Cited

U.S. PATENT DOCUMENTS

| | | | | |
|---|---|---|---|---|
| 6,278,100 | B1* | 8/2001 | Friedman | G02B 27/644 |
| | | | | 359/399 |
| 7,272,521 | B1* | 9/2007 | Delos | G01R 23/20 |
| | | | | 324/76.83 |
| 7,656,539 | B1* | 2/2010 | Lee | G02B 26/06 |
| | | | | 356/450 |
| 10,928,192 | B2* | 2/2021 | Williams | G01D 5/266 |
| 2016/0103307 | A1* | 4/2016 | Frankel | G02B 21/0032 |
| | | | | 600/317 |
| 2017/0030830 | A1* | 2/2017 | Kapit | G01B 9/02044 |

OTHER PUBLICATIONS

Desantis, Zachary J. University of Rochester ProQuest Dissertations Publishing, 2017, 10623793 (Year: 2017).*

DeSantis, Zachary J. et al., "Phase-Error Mitigation in Optical Interferometric Imaging," SPIE Proceedings, vol. 11836, 7 pages, Aug. 1, 2021.

* cited by examiner $$\begin{bmatrix} 1 & 0 & 0 \\ 0 & 1 & 0 \\ 0 & 0 & 1 \\ -1 & 1 & 0 \\ -1 & 0 & 1 \\ 0 & -1 & 1 \end{bmatrix} \begin{bmatrix} L_1 \\ L_2 \\ L_3 \end{bmatrix} = \begin{bmatrix} \Delta L_{10} \\ \Delta L_{20} \\ \Delta L_{30} \\ \Delta L_{21} \\ \Delta L_{31} \\ \Delta L_{32} \end{bmatrix}$$

PHASE CORRECTION FOR OPTICAL INTERFEROMETRIC IMAGING

RELATED APPLICATIONS

This application hereby claims the benefit of and priority to U.S. Provisional Patent Application 63/226,820, titled "PHASE CORRECTION FOR OPTICAL INTERFEROMETRIC IMAGING," filed Jul. 29, 2021, which is hereby incorporated by reference in its entirety.

GOVERNMENT RIGHTS STATEMENT

This invention was made with Government support under contract no. FA8650-18-C-9103 awarded under the Amon Hen project of the Intelligence Advanced Research Projects Activity (IARPA). The Government has certain rights in the invention.

TECHNICAL BACKGROUND

Optical interferometric imaging is an imaging technique founded on the Van Cittert-Zernike theorem, where the spatial coherence of light observed from an object generally increases with distance from the object and is related to the radiance distribution of the object through a Fourier transform. From this, optical interferometric imaging utilizes more than one telescope to synthesize an aperture many times larger than a single telescope. The aperture size and sparsity are related to various factors, such as telescope quantity, telescope placement, and the baselines or separations between the telescopes. Often, a larger quantity of telescopes is established over a given area to reduce sparsity or achieve a greater sampling within the aperture, albeit with various physical and algorithmic limitations on the ultimate quantity of telescopes deployed. To perform measurements using interferometric imaging, light collected from the telescopes is optically interfered to produce an interference fringe having a magnitude and phase proportional to a corresponding Fourier component of the object. From the corresponding magnitude and phase properties, an image can be produced of a scene or object.

However, random wavefront phase errors due to atmospheric fluctuations (discussed herein primarily as the piston contribution to the errors) as well as mechanical shifts and vibrations in the telescopes and optical interconnect links, are a challenge for producing good interference fringes and ultimately clear images using ground based optical imaging interferometers. While interference fringes can be stabilized over time, only relative changes from the start of the fringe tracking, and not the initial phase errors, are recovered.

In one example technique, referred to as fringe tracking, a rapid path length control loop is utilized to stabilize fringes through time. This allows for "coherent integration" using summing of the fringes for signal-to-noise ratio (SNR) boosts prior to extracting amplitude and phase. However, in fringe tracking, initial phase error is still a random unknown quantity. In another example technique, referred to as baseline bootstrapping, short baseline measurements are used to stabilize a long baseline fringe. The amplitude of the fringe determines the SNR, where higher amplitude fringes are easier to measure and fringe track. Fringe amplitude is proportional to the Fourier component amplitude, but Fourier strength falls off rapidly for long baselines. Baseline bootstrapping tracks on a series of short baselines to stabilize and integrate long-baseline fringe without directly measuring. However, baseline bootstrapping only allows for fringe tracking on long baselines and still has the random unknown phase error. In yet another example technique, referred to as closure phase, a product of measurements is taken from a closed loop of telescopes (i.e. among a set of three telescopes). Path length error phase contributions cancel out leaving only the product of object Fourier phases. Closure phase is noisy because the technique is the product of multiple measurements. Thus, closure phase breaks down if one of the baselines has a low fringe visibility, and this technique only provides partial phase information. Finally, another example mitigation technique, image reconstruction, uses an image reconstruction algorithm to form an image using the amplitude and partial phase information. This technique needs a longer run time to solve for missing phase information and is not guaranteed to converge on a solution.

Overview

Provided herein are various enhancements for ground-based optical interferometry and processing interference fringe data produced by optical interferometry. Interference fringe data results from interfering a plurality of optical signals collected by telescopes or other optical collection devices distributed over a geographic area. The interference fringe data can ultimately be used to construct a viewable image of a scene or object within a scene, with greater detail than typically possible with only a single telescope. However, when observing objects through an atmosphere or beyond an atmosphere, interference fringe data is subject to various random noise, random pathlength errors, and other unpredictable variations. Although various prior techniques, as mentioned above, have been employed with varying success, the enhanced implementations herein provide several advantages. Among these advantages are significantly reduced errors in interference fringe phase data (which is used to reconstruct the images), image reconstruction algorithms can be significantly less complex, need less time to converge, and have a significantly greater probability of converging on high fidelity reconstructions.

One example implementation includes a method producing an interference fringe image by interfering multispectral optical signals of a scene supplied by optical collection devices. The method includes transforming the interference fringe image into a frequency domain representation comprising spectral channels corresponding to interfered combinations among the multispectral optical signals, determining pathlength errors of beam paths associated with the optical collection devices by concurrently processing the spectral channels of the frequency domain representation, and removing the pathlength errors in the frequency domain representation to produce a corrected frequency domain representation. The method also includes constructing a corrected image of the scene from the corrected frequency domain representation.

Another example implementation includes an apparatus comprising an imaging interface configured to obtain an interference fringe image produced by interfering multispectral optical signals of a scene supplied by optical collection devices. The apparatus also includes a fringe processor configured to transform the interference fringe image into a frequency domain representation comprising spectral channels corresponding to interfered combinations among the multispectral optical signals, determine pathlength errors of beam paths associated with the optical collection devices by concurrently processing the spectral channels of the frequency domain representation, and remove the pathlength errors in the frequency domain representation to produce a corrected frequency domain representation. The apparatus also includes an image processor configured to construct a corrected image of the scene from the corrected frequency domain representation.

Yet another example implementation includes software readable by a computing device, tangibly embodying instructions that, when executed by the computing device, direct the computing device to at least obtain an interference fringe image produced by interfering multispectral optical signals of a scene supplied by optical collection devices. The software includes further instructions to transform the interference fringe image into a frequency domain representation comprising spectral channels corresponding to interfered combinations among the multispectral optical signals, determine pathlength errors of beam paths associated with the optical collection devices by concurrently processing the spectral channels of the frequency domain representation, and remove the pathlength errors in the frequency domain representation to produce a corrected frequency domain representation. The software includes further instructions to construct a corrected image of the scene from the corrected frequency domain representation.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates an example pathlength error correction process in an implementation.

DETAILED DESCRIPTION

Figure 1:
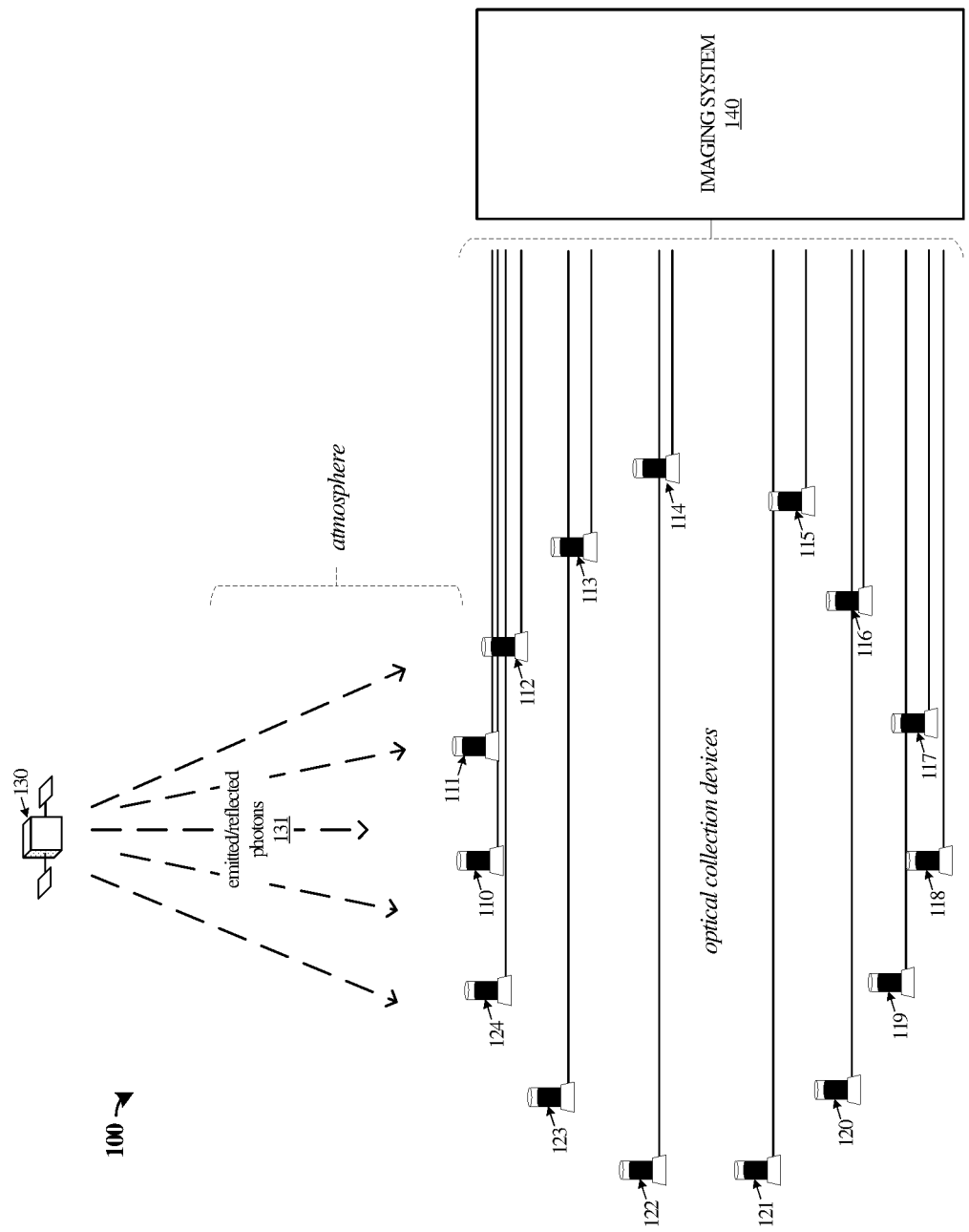
FIG. 1 illustrates an interferometric telescope arrangement in an implementation.

Various photonic collection devices, such as optical telescopes, can be employed to make observations across a range of wavelengths. When ground-based, these photonic collection devices must typically receive photons that have propagated through the atmosphere. Observations made through the atmosphere present several challenges, and among these are random atmospheric fluctuations leading to random phase errors in the collected light. These random phase errors can be especially limiting to ground-based optical imaging interferometers which employ more than one optical collection device in tandem to establish a larger optical aperture. Several techniques in the past have been devised to reduce the effect of atmospheric fluctuations on optical observations. However, these past techniques have several drawbacks, as noted herein. Also, although optical signals and optical observations are discussed, it should be understood that the enhanced techniques are not limited to the range of human-detectable photonic wavelengths, and instead can apply to various photonic spectra which includes optical wavelengths and other electromagnetic wavelengths. While the equipment used to observe various photonic signals can vary based on the desired wavelengths, these enhanced techniques apply to multispectral measurements across a range of suitable wavelengths.

Presented herein are techniques and systems for providing enhanced fringe image handling and image reconstruction which reduces phase errors attributable to atmospheric disturbances or an external environment associated with elements of an optical imaging interferometer. In ground-based optical imaging interferometers, interference fringe images of an observed scene are measured by an imaging system and processed to extract sparse Fourier components of the observed scene. These Fourier components, also referred to as frequency domain components, are employed in an enhanced image reconstruction algorithm to ultimately construct an image of the scene. Random path length errors due to observing the scene through an atmosphere manifest as phase errors in the measured fringe data collected by the imaging system. The phase errors in the interference fringes are evident as phase errors in the extracted Fourier components. Historically, image reconstructions using the fringe data having such phase errors have required significant processing time and complex algorithms that are not guaranteed to converge algorithmically. The enhanced techniques discussed herein solves for the path length errors of the system and applies resulting calibrations to the fringe data. With significantly reduced phase errors in the extracted Fourier components, image reconstruction algorithms can be significantly less complex, need less time to converge, and have a significantly greater probability of converging on a high-fidelity reconstruction.

A number of prior methods try to extract error-free phase information from fringe images. One technique is called closure phase, which takes specific triplets of measurements and adds the phases (i.e. multiplies the Fourier components) together to cancel the path length errors. The result of closure phase is a sum of 3 uncorrupted scene Fourier phases, though, and not the individual measurements. Another related technique is called baseline bootstrapping, which selects presumably high-signal short-baseline measurements to bootstrap fringe tracking (and thus allow for coherent integration) over longer-baseline measurements, which are typically low-signal and too weak for direct fringe tracking. Other attempts at solving this problem focus on image post-processing and image reconstruction techniques, as noted above. Numerous image reconstruction algorithms, some of which take days to run in practice, attempt to recover missing phase information while trying to form an image that is consistent with the measurements and prior information. However, these image reconstruction algorithms are not guaranteed to converge on a usable result and often require expert fine tuning for any particular system, dataset, or image formation attempt.

The enhanced techniques discussed herein provide a complete phase estimate. The recovered phases can be sufficient to perform a "dirty" direct inversion of the sparse Fourier measurements as a reasonable representation of the ideal image. The enhanced techniques discussed herein also operate in conjunction with other techniques, such as baseline bootstrapping, to allow more robust coherent integration by solving for certain absolute phase errors in an interferometric system. One example implementation employs a weighted least-squares inversion to establish a more robust phase estimate. For example, if any baseline measurement (whether long or short) is near a signal null, the weighted least-squares inversion automatically provides for full or partial suppression of such a measurement, and instead relies more heavily on other baseline combinations with associated telescopes and more information. This improves upon prior techniques of baseline bootstrapping, which would otherwise break down with low-signal measurements in any baselines used and take no advantage of partial information available from any unused baselines. Moreover, the weights used in the weighted least-squares inversion can be data-driven without any reliance on prior models, classifications, or assumptions. While the phase estimates from the techniques discussed herein still may have some phase errors and noise, the errors and noise are reduced to being low enough for an image reconstructing algorithm to easily recover. Moreover, a reduction in complexity, execution time, failure rate, and errors in image reconstruction is provided using the implementations herein.

Turning to a more detailed discussion of enhanced optical interferometry techniques and implementations, several Figures are presented. FIG. 1 illustrates an example system 100 which can integrate features of the enhanced techniques and equipment elements to perform optical interferometry observations. System 100 includes a plurality of optical collection devices 110-124, such as telescopes or other devices capable of observations, which are coupled to imaging system 140. Optical collection devices 110-124 are laid out in a ring-like pattern, slightly adjusted for improved Fourier coverage. When employed for observations, any of optical collection devices 110-124 can observe a scene which is populated by objects, such as orbital satellite device 130 that emits or reflects photons 131 toward optical collection devices 110-124, among other objects including astronomical objects. While independent optical measurements can be performed by optical collection devices 110-124, the examples herein discuss interferometric measurements concurrently employing observations from more than one of optical collection devices 110-124 to synthesize an aperture larger than a single optical collection device.

During operation, optical collection devices 110-124 collect light over a range of optical wavelengths, referred to as multispectral observations, which has propagated from an object of interest and through the atmosphere. One example range of wavelengths comprises 970 nanometers (nm) to 1750 nm. This collected light can be transmitted to imaging system 140 over associated optical links for optical interference and projection onto an imaging device of imaging system 140. This optical interference produces a fringe image which is digitized by the imaging device of imaging system 140. From here, a digital representation of the fringe image is processed according to various techniques described herein to produce a reconstructed image comprising a scene having the object of interest. However, pathlengths of the associated arms of the interferometer can randomly vary based on atmospheric disturbances and movement of the optical collection devices. Thus, a pathlength will have static components and dynamic components, the static components typically correspond to lengths of the optical links coupling the optical collection devices to an imaging system or collection hub, while the dynamic components vary randomly over time.

Figure 2:
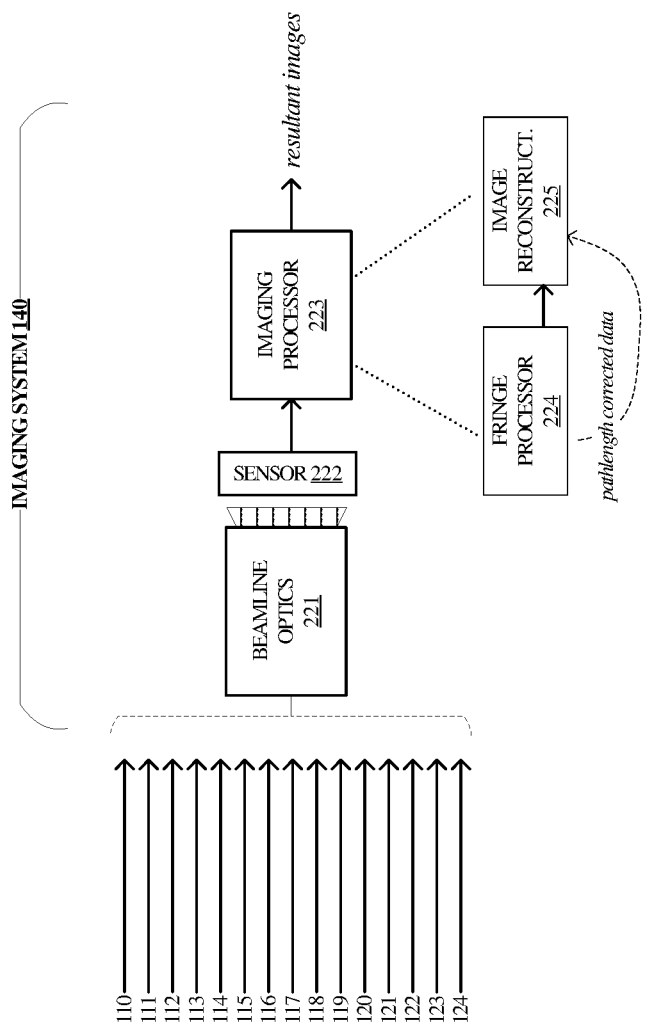
FIG. 2 illustrates an imaging system in an implementation.

FIG. 2 further illustrates elements which can be employed in FIG. 1 and imaging system 140. In FIG. 2, beamline optics 221 receive optical energy comprising multispectral measurements made by optical collection devices and provided over corresponding optical links. Beamline optics 221 interface with the optical links and included optical elements which project the multispectral measurements onto sensor 222 to form a fringe image on sensor 222. Sensor 222 digitizes the fringe image and transfers the digital representation of the fringe image to imaging processor 223 for phase error reduction and image reconstruction. Imaging processor 223 comprises fringe processor 224 which produces pathlength corrected data which is a corrected version of the digital representation of the fringe image. This corrected data is provided to image reconstruction module 225 that reconstructs a resultant image from the corrected data, and the resultant image is transferred for storage or further processing and analysis.

Turning now to a discussion on the elements of FIGS. 1 and 2, optical collection devices 110-124 comprise various equipment for making multispectral observations over a bandwidth of wavelengths, typically in the optical range. Multispectral observations refer to observations that span a set range of wavelengths, which can depend on the equipment employed, optical material reflection, absorption and transmission, atmospheric opacity, media dispersion characteristics, or other factors. Implementations of optical collection devices 110-124 can include telescopes comprising reflecting or refracting types with associated reflectors and lenses. Optical collection devices 110-124 can also include various structures, mounts, motorized mounts, targeting elements, and optical link interface elements. Optical link interface elements can include optical fiber connectors, index matching elements, mirrors, lenses, and similar equipment which can interface with optical fibers or optical waveguides comprising the optical links discussed herein.

Imaging system 140 comprises an interferometric processing system that receives optical observations, produces interference fringe images, and processes those fringe images to produce resultant images of a scene or object. In some implementations, imaging system includes elements from FIG. 2, namely beamline optics 221, sensor 222, and imaging processor 223, although variations are possible.

Beamline optics 221 comprise optical link interfacing elements, such as those mentioned above for optical collection devices 110-124, as well as elements to physically position outputs of the beamlines from each of optical collection devices 110-124. Beamlines in this example refer to the optical signals which comprise the multispectral observations. Beamline optics 221 position each of the beamlines such that the corresponding optical signals interfere with all or a selected subset of the other beamlines. In one example, a linear arrangement is established, where each beamline is aligned in a sequential and linear manner. In this linear arrangement, any given beamline will interfere with all other beamlines, with beamlines from neighboring optical collection devices interfering more strongly than distant collection devices in general. Other arrays and configurations are possible. The selected arrangement of beamlines establishes a projection onto an optical target, which can correspond to a fringe image.

Sensor 222 comprises a digital imaging sensor configured to convert optical signals into a digital representation, such as a fringe image. Sensor 222 can comprise various types of optical sensors, such as active-pixel sensors (APSs), metal-oxide-semiconductor (MOS) active-pixel sensors, charge-coupled device (CCD) image sensors, photodetectors, photodiodes, or other imaging devices. Various optical filters, reflectors, focusing elements, or lenses might be employed along with an imaging sensor. Arrays of imaging sensors may be employed, along with various control, power, and interfacing electronics. Sensor 222 produces digital images in a corresponding digital configuration which is provided over a digital link to imaging processor 223.

Imaging processor 223 comprises data processing elements, data storage elements, and digital interfacing elements. Example data processing elements include microprocessors, computer systems, distributed computing systems, central processing units (CPUs), graphics processing units (GPUs), or other specialized, programmable, or discrete processing and logic elements. Example data storage elements include storage drives, memory devices, solid state storage devices, magnetic storage devices, optical storage devices, or other similar data storage devices, including various interfacing circuitry. Digital interfacing elements include network interfaces, packet interfaces, parallel or serial digital interfaces, physical network links, or other various interfacing elements.

Imaging processor 223 can include fringe processor 224 and image reconstruction module 225. Fringe processor 224 and image reconstruction module 225 can comprise various hardware or software components which perform techniques and algorithmic processing as discussed herein. For example, fringe processor 224 can convert or transform digital images in spatial or spectral domains into a frequency domain or Fourier domain comprising spectral channels corresponding to interfered combinations among the multispectral optical signals. The digital images may comprise interference fringe images. From here, fringe processor 224 can determine pathlength errors of beam paths associated with the optical collection devices by concurrently processing the spectral channels of the frequency domain representation, and remove the pathlength errors in the frequency domain representation to produce a corrected frequency domain representation. Image reconstruction module 225 can transform the corrected frequency domain representation from the frequency domain representation into a spatial or spectral domain representation, and construct a corrected image of the observed scene. In a normalized frequency domain representation, the 'visibility' of a scene or object is related to the sparse samples estimated by fringe processor 224 from fringe images captured by sensor 222 and from which object images of a scene are reconstructed by image reconstruction module 225. A property of the scene by definition, the complex visibility is encoded into fringe amplitudes and phases by an interferometry and imaging system and then decoded using a frequency domain representation. It should be understood that fringe images of the captured fringes (i.e. input of fringe processor 224) and objects/images of the observed scene (i.e. the output of image reconstruction module 225) are in different domains. Thus, the fringes encode the objects/scenes, but are not direct representations of the objects/scenes.

Figure 3:
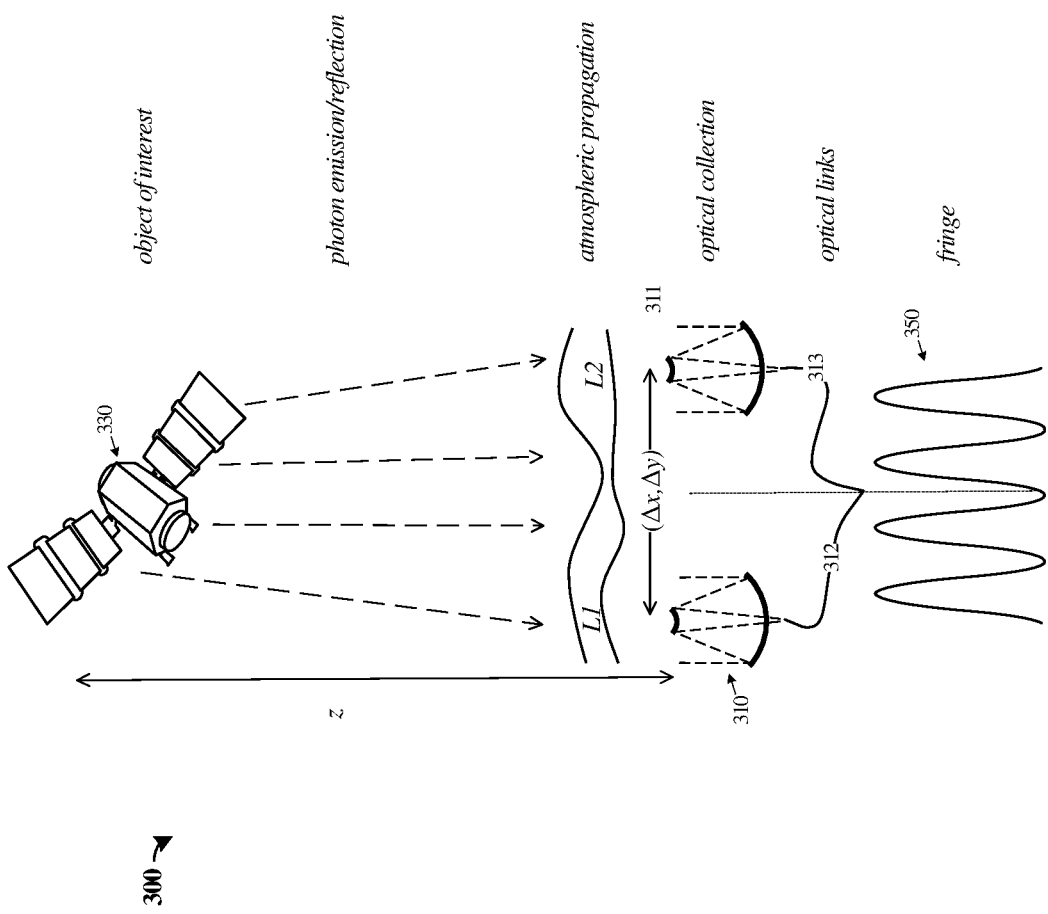
FIG. 3 illustrates an example interferometric observation.

FIG. 3 illustrates example optical interferometric system 300 showing propagation and observation of light through an atmosphere, with production of an interference fringe using optical interferometry. While FIG. 1 shows fifteen optical collection devices, FIG. 3 shows two selected optical collection devices 310-311 for exemplary purposes, referred to as interferometer arms. Optical collection devices 310-311 are distributed over a geographic region, indicated by a difference in coordinates of at least two axes ($\Delta x$, $\Delta y$) with respect to a surface of a site that houses the optical interferometric system. At the top of FIG. 3 is object of interest 330, such as a spacecraft, astronomical object, satellite device, or other object which lies beyond the atmosphere of the planet. Object of interest 330 is shown being a mean distance or separation 'z' from optical collection devices 310-311. As light which is emitted or reflected by the object propagates through the atmosphere, various atmospheric disturbances can occur that lead to errors in the detected light and associated images. While some propagation errors can be corrected using various passive or active optical techniques, such as using specialized mirrors or deformable optical elements, some errors can still persist. Optical links 312-313 provide the collected light to an imaging system (not shown) which produces interference fringe 350 represented by the sinusoidal waveform in FIG. 3.

This example focuses on pathlength errors or differences in phase of incoming light which is attributable to the atmospheric disturbances or to vibrations and other thermal or mechanical changes of the optical collection devices. Interferometric imaging measures amplitudes and phases of these interference fringes which correspond to Fourier components of the scene. Path length errors arise from atmospheric phase errors and each arm of the interferometer has non-common path errors. Pathlength differences are shown in FIG. 3 with different 'lengths' L1 and L2 which correspond to a particular optical collection device. When more arms are employed, each arm will have a corresponding pathlength. Pathlength differences between arms of the interferometer result in a corrupted phase measurement that rapidly varies with the atmosphere. Phase information is extremely valuable for forming an image from the Fourier components. These pathlength differences and corresponding phase errors can be referred to as piston errors which correspond to differences in wavefronts or phase profiles across the optical collection sensors of optical collection devices 310-311. While optical collection devices 310-311 comprise reflective telescopes in this example, other types or styles of telescopes can be employed.

Figure 4:
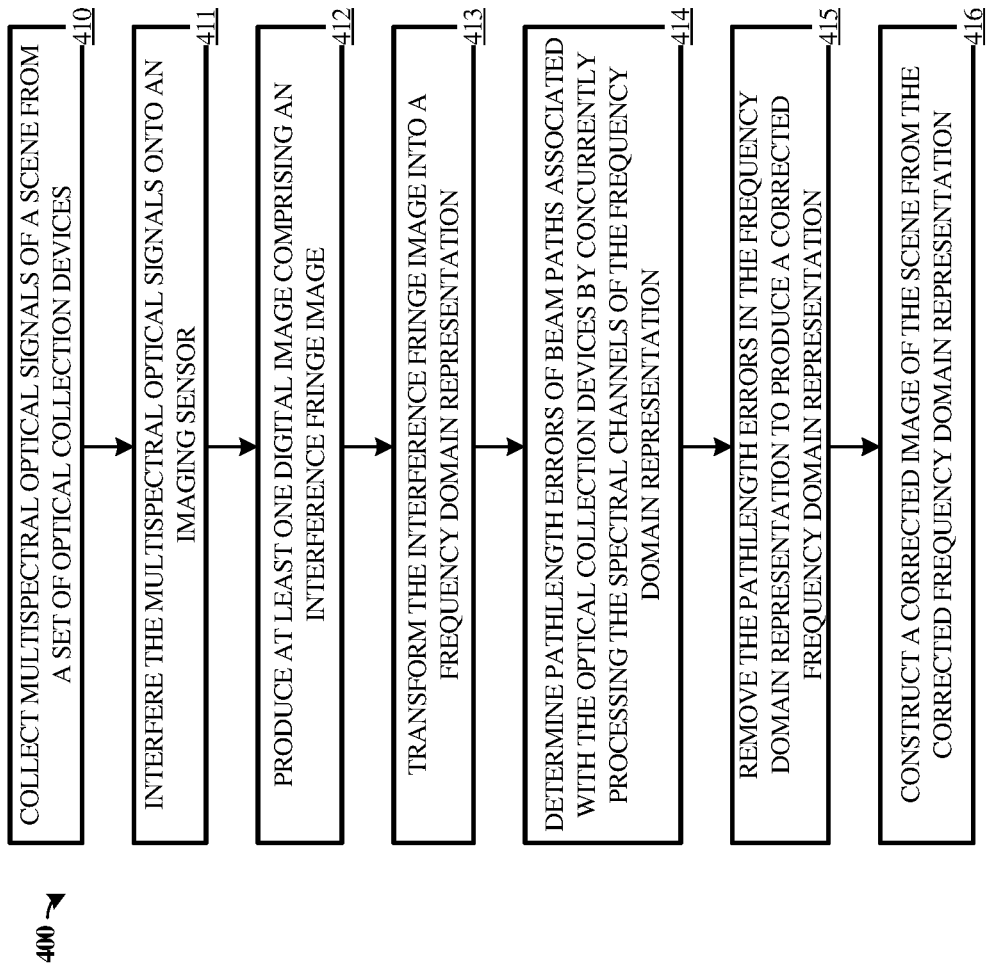
FIG. 4 illustrates a method of operating an imaging system in an implementation.

FIG. 4 illustrates method 400 of operating an imaging system in an implementation. The operations of FIG. 4 are discussed within the context of elements of FIGS. 1 and 2, but it should be understood that other elements can be employed, such as those found in FIGS. 3 and 7. Furthermore, FIGS. 5 and 6 are provided as example configurations and implementations for operations discussed in FIG. 4.

In operation 401, imaging system 140 collects multispectral optical signals of a scene from a set of optical collection devices 110-124. In this example, the scene comprises object 130 located beyond an atmosphere of a planet, such as Earth, and optical collection devices 110-124 receive photons 131 reflected/emitted by object 130. Each of optical collection devices 110-124 can collect optical energy over a range of wavelengths to establish the multispectral optical signals. In many examples, optical collection devices 110-124 comprise optical telescopes which collect light over a predetermined range of times and temporal frequencies and focus/channel the collected light over associated optical links to imaging system 140. These optical links, such as optical fibers or waveguides, carry the actual optical signals gathered by each associated optical collection devices. Each optical link can be referred to as a beamline, with each telescope and link comprising an arm of the optical interferometer. Thus, a 'beam' is produced by each optical collection device which is transported optically to imaging system 140.

The physical arrangement of optical collection devices 110-124 over a particular geographic area can vary. The physical arrangement can comprise characteristics such as quantities of optical collection devices, physical locations of each device, density of the optical collection devices over a site area, and proximity or relative positioning of neighboring devices to each other. The physical arrangement of the optical collection devices can be selected to produce the multispectral optical signals to achieve at least one observation characteristic target among a target reduction in influence of atmospheric induced pathlength errors or a target Fourier fill characteristic in the resulting interference fringe image. In some examples, a relatively fixed physical arrangement, such as quantity and placement, is established, and one or more sets among the total quantity of optical collection devices is selected to meet the observation characteristic target. At least three optical collection devices are employed to produce a set of multispectral optical signals, with more optical collection devices employed for greater synthetic aperture sizes, higher Fourier fill characteristics, or greater reduction in atmospheric induced pathlength errors. For a particular timeframe, a set of optical collection devices might collect a first multispectral observation. At a subsequent timeframe, a set of optical collection devices might collect a second multispectral observation. Then, a synthetic combination of the first multispectral observation and the second multispectral observation can synthesize the entire aperture. Both the initial multispectral observation and the additional (later) multispectral observation can be combined in imaging system 140 to produce resultant images after correction in the frequency domain. However, in the examples discussed for FIG. 4, concurrent measurement or optical collection by all optical collection devices 110-124 is performed.

Figure 5:
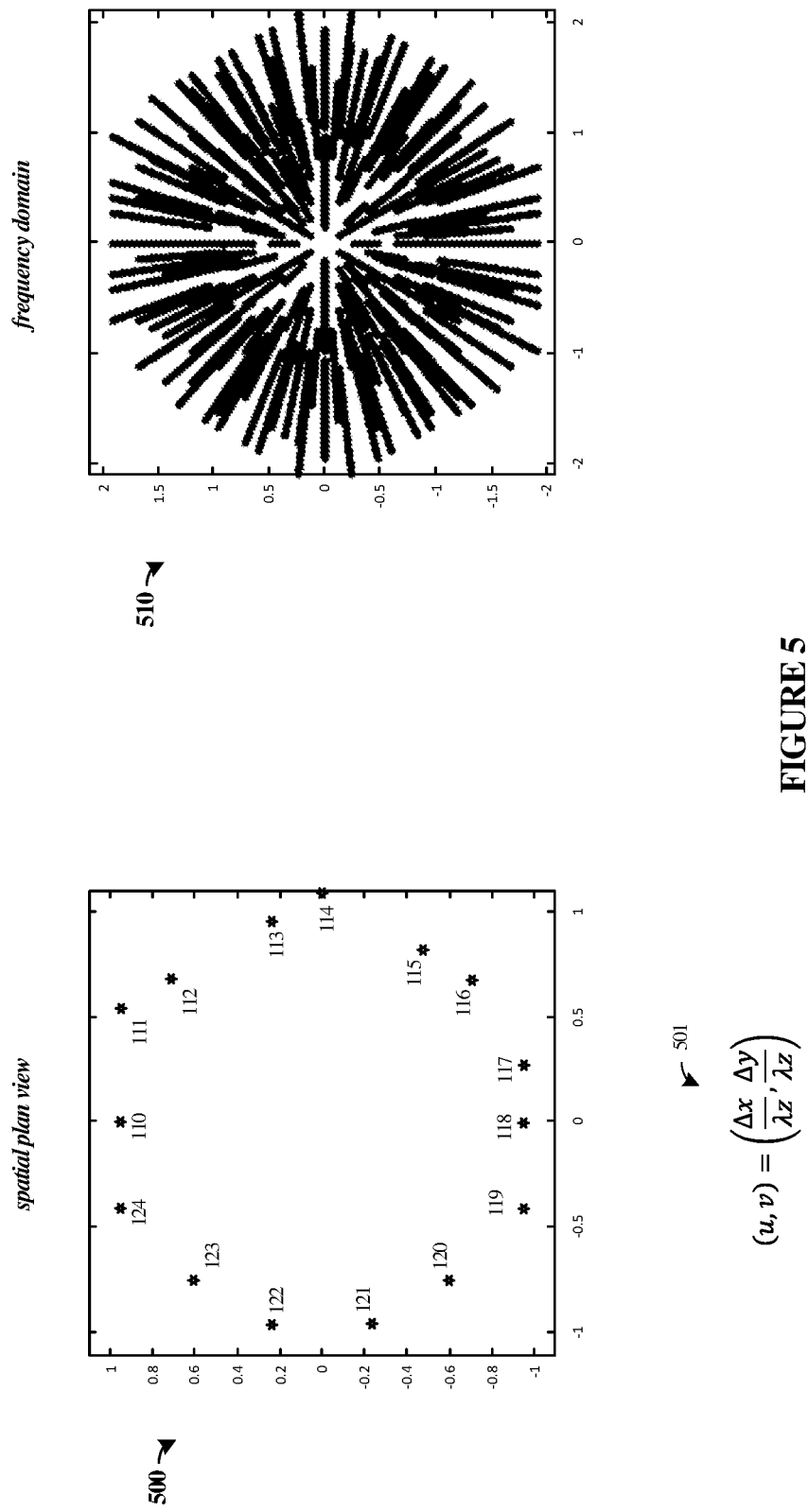
FIG. 5 illustrates example interferometric configurations.

FIG. 5 illustrates example interferometric configuration 500 comprising a view of optical collection devices 110-124 in a spatial plan view. In configuration 500, an overhead or plan view of the spatial arrangement of optical collection devices from the viewpoint of the object or observation target, which is one example physical arrangement of optical collection devices. Configuration 500 shows optical collection devices 110-124 (from FIG. 1) in relation to normalized 'x' and 'y' coordinate plane, which is a plane perpendicular to the line of site to the target. Actual physical ground locations are the projected 'x' and 'y' coordinates from that plane to the ground. While each optical collection device has a corresponding physical location on the surface of the planet, the u,v coordinates are the corresponding Fourier frequency coordinates which depends on which beamlines are combined. For this example all beamlines interfere with all other beamlines. Also, a z component will also vary for each optical collection device when objects of interest are skewed or tilted with respect to a vector normal to the mean surface of the ground, which is related to a present inclination and azimuth of the object of interest as well as the altitudes of the optical collection devices. To account for this the corresponding beamlines have extra pathlength to produce a gross path correction giving all collection arms the same 'z' coordinate except for the previously described pathlength disturbances due to the atmosphere, system vibrations, and other contributing factors. Equation 501 shows this relation between x, y, and z, wavelength, and the u,v coordinates.

Turning now to operation 411, once the multispectral observations are conducted, the collected light is transferred over corresponding optical links to imaging system 140. Imaging system 140 then interferes the multispectral optical signals to produce an interference fringe. This interference fringe is projected onto an imaging sensor which digitizes (411) the interference fringe into a digital representation in a fringe/spectral/spatial domain. This digital representation comprises a digital image which can take a suitable digital image format or type. In FIG. 2, the imaging sensor comprises sensor 222 which provides the digital image to imaging processor 223 over an associated digital link.

FIG. 2 also shows further detail on the interference operations. In FIG. 2, all of the 15 beams produced by optical collection devices 110-124 are combined and interfered by beamline optics 221 to produce an interference fringe on sensor 222. The type of combination comprises an all-on-all beam combination that simultaneously establishes interference fringes for all pairwise combinations among the observations produced by optical collection devices 110-124. The beams are optically interfered by physically positioning outputs of the optical links next to each other in a selected array or arrangement, where the outputs comprise the optical links coupled to any associated beamline optics that project the beams onto a target (sensor). While subsets of optical collection devices 110-124 can instead be used, the greater quantity of telescopes employed can relate to a more robust measurement and interference fringe. As mentioned, beam combination is an all-on-all approach with multispectral measurements. As a consequence of this arrangement, short baselines between arms of the interferometer will tend to have larger SNRs than long baselines. Baselines or baseline separation refers to a direct displacement between individual optical collection devices.

Once the interference fringe image, also referred to as interference fringe data, has been obtained by image processor 223, then image processor 223 transforms (413) the interference fringe image into a frequency domain representation. Fringe processor 224 can perform this operation in FIG. 2. This transformation typically comprises performing a Fourier transform or a similar estimation calculation to determine frequency components of the interference fringe image. The frequency domain representation comprises frequency components having a complex phase and amplitude that each indicate a spectral channel corresponding to interfered combinations among the multispectral optical signals. Since the all-on-all beam combination noted above is performed for multispectral optical signals, and due to the physical alignment of the beams with respect to each other during interference, each pairwise combination of beams for each selected frequency bin will have a corresponding spectral channel or unique fringe period in the frequency domain. The particular spacing of spectral channels on the detector or sensor leads to unique fringe components in the frequency domain for each pairwise combination which can be used to identify each beam in the frequency domain. From the beam identification, each optical collection device which originates optical signals for each spectral channel can be determined.

When fifteen (15) beams from the optical collection devices are employed, then 105 pairwise combinations each produce a spectral channel in the frequency domain. As will be discussed below, the 105 unique spectral channels can be employed to solve for pathlength errors among the 15 beams, and these pathlength errors can be removed from the original interference fringe data. This is due in part to phase errors for each arm of the interferometer being largely the same or similar for each pairwise combination involving that arm, thus each pairwise fringe measurement produces a phase ramp with a slope proportional to the difference in pathlength errors (piston). From measuring the 105 pathlength differences, the 15 unique pathlength errors can be estimated.

Frequency domain representation 510 in FIG. 5 illustrates one possible frequency domain representation in a graphical format. Representation 510 comprises a Fourier coverage plot having a two-dimensional frequency domain representation in the complex plane having axes that correspond to (1) each beam fringe position on the detector/sensor (i.e. baseline displacement between optical collection devices) and (2) optical wavelengths of the beams. As can be seen in representation 510, a collection of radially oriented spokes of fringe data is seen arrayed about an origin. A total of 210 spokes is established by the 105 pairwise combinations of the 15 beams mirrored through the origin in the complex plane. Representation 510 can also be indicated by a matrix of complex numbers on a per-wavelength bin basis. Lengths of each of the spokes correspond to bandwidths of the multispectral optical signals, and relative positioning among the optical collection devices establishes placement of the spokes. Longer spokes indicate more separation between a pair of collection devices, while shorter spokes indicate less separation between a pair of collection devices.

During collection of fringe data, the outer periphery of spokes from the origin in representation 510 are typically changing over time due to random phase errors (e.g. piston) as well as from changes in scene/object phases. The outer periphery of spokes correspond to non-neighboring interference resulting from beams that are less closely positioned during interference. The spokes near the origin (inner) are also typically changing over time, and the change in phase is typically less from changing object phases than from random phase errors (piston). The inner spokes correspond to neighboring interference resulting from beams that are more closely positioned during interference. Phase errors change for all spokes (on average) fairly equally. Spokes near the origin have the same number of samples/spectral channels than the periphery, but cover less space in the Fourier domain. The phase change from spectral channel to spectral channel for these spokes near the origin is due more to the phase ramp caused by pathlength errors than due to the change in object information. If the sampling among beams and wavelengths is dense enough to achieve a target Fourier fill characteristic, then phase differences between spectral channels is primarily due to pathlength errors (piston) and not changes in observed object phases. Moreover, the random phase errors scale linearly across wavelength, referred to as being structured, and thus can be correctable as discussed below.

Imaging system 140 or fringe processor 224 determines (414) pathlength errors of beam paths associated with the optical collection devices by concurrently processing the spectral channels of the frequency domain representation. The term pathlength error can also refer to as piston error, and refers to the piston experienced by each individual optical collection device. The pathlength errors comprise piston errors affecting observations of the optical collection devices attributable to one or more among atmospheric disturbances and an external environment of the optical collection devices, such as motion of the optical collection devices. The concurrent processing provides for solving for differences in phase among the 105 pairwise combinations, and thus solving for 15 unknowns to converge/recover phase information for each beam. Because an absolute piston can be subtracted from all beamlines, one beamline can be taken as "known" to be zero—leaving only 14 unknowns relative to this "known" reference. This concurrent processing of the pairwise combinations does not discard data of any of the beams. This is in contrast to older techniques that might discard data of particular beams which at any given instant might or might not produce desirable data. Instead, the enhanced techniques herein use the data and can apply weights or weight values to scale importance of each beam in the end result. This scaling combined with a multispectral measurement across many wavelength bins provides a denser Fourier fill than other techniques and allows for solving directly for the pathlengths errors.

Imaging system 140 averages over phase differences along each spoke and solves for pathlength differences on a pairwise combination basis. Imaging system 140 uses the measured spectral phase data to cancel contributions from the scene or object. The remnant phase differences are unwrapped and converted to pathlength differences between any two arms of the interferometer. The differences are used with a weighted-least-squares inversion to solve for the absolute path error in each arm of the interferometer and then apply the necessary post-processing calibration to the data. The least-squares inversion provides the estimated path length errors for each arm of the interferometer, which can be used for a phase correction of the interference fringe data. Because this technique becomes less valid as baseline length grows and, in general, the signal-to-noise ratio (SNR) drops as baseline length grows, an optional distance weighting can be included in the least-squares inversion emphasizing shorter baselines. The weighting is also more effective with a combination of long and short baselines.

As mentioned, optional weights can be applied according to a quality of a beam or quality of a baseline. Telemetry can be employed to determine quality metrics of each beam or baseline at a time of capture of the interference fringe data or surrounding time of capture, and quantitative weight values can then be assigned to the portion of the fringe data for each beam or baseline based on the quality metrics. The weight values are determined based on characteristics selected among relative positioning of the optical collection devices (baseline length), signal strengths associated with the multispectral optical signals, and noise levels associated with the multispectral optical signals, among other characteristics or metrics. Imaging system 140 then employs the interference fringe data in the frequency representation along with the weights to produce a corrected frequency domain representation using one or more mathematical operations. In one example, imaging system 140 determines pathlength errors of beam paths associated with the telescopes by concurrently processing the spectral channels of the frequency domain representation. Concurrently processing the spectral channels can include determining the pathlength errors relative to a nominal value by performing a least squares linear regression or nonlinear fit employing the spectral channels.

FIG. 6 illustrates an example pathlength error correction procedure 600 in an implementation. With the context of representation 510 in FIG. 5, phase differences along each spoke can be represented by the following equation:

$$\Psi_{jk}(\lambda_{n+1}) - \Psi_{jk}(\lambda_n) = \psi_{jk}(\lambda_{n+1}) - \psi_{jk}(\lambda_n) + 2\pi\frac{\lambda_{n+1}}{c}\Delta L_{jk} - 2\pi\frac{\lambda_n}{c}\Delta L_{jk};$$

where $\Delta L_j$, $k = L_j - L_k$, c refers to the speed of light, k refers to wavelength, L refers to pathlength and $\Psi$ refers to phase. Because the above equation is well satisfied under the arrangement discussed in FIG. 5, the adjacent spectral bands are well within a degree-of-freedom, meaning the object phase changes are small in comparison to pathlength errors. Thus, a more simplified equation can apply, namely:

$$\Psi_{jk}(\lambda_{n+1}) - \Psi_{jk}(\lambda_n) \approx 2\pi\Delta L_{jk}\left(\frac{\Delta\lambda}{c}\right).$$

While this approximation may contain error, the equation is applied to every spectral channel, which adds robustness to the assumption, to noise, and low signal if a spoke crosses through or near a zero in Fourier space. Large phase jumps are wrapped between ±π. The value of $\Delta L_{j,k}$ is solved for each adjacent spectral channel. With the difference in object phases being zero-mean random numbers, a median can be taken across the results, again, providing robustness to the approximation and providing the final estimate for the phase ramp amplitude, $\Delta L_{j,k}$. With the $(N)(N-1)2$/estimated path length differences, an overdetermined set of equations is used to solve for the N−1 unknown path length errors relative to nominal. There are really N unknowns, but, because a global piston is irrelevant, the first beam and optical collection device (or more generally a weighted average of up to N beams and optical collection devices) can be set to a nominal path length error of zero. All other path length errors are taken relative to that piston reference.

The set of equations for an example 4-telescope system, with L1 predetermined as zero, is seen in FIG. 6. Procedure 600 shows a least squares process (shown as unweighted for ease of presentation but without loss of generality) with four telescopes each having a corresponding pathlength L0, L1, L2, and L3 that includes pathlength errors due to piston. The first matrix in FIG. 6 represents the pairwise combinations of the beamlines and the second matrix corresponds to the pathlengths of each beamline. The right side of the equation indicates pathlength differences between each pairwise combination of beams. From these pairwise pathlength differences, pathlength errors for each beam can be determined. A similar procedure can be performed for a greater number of beams or optical collection devices, such as 15, or with several sets of optical collection devices producing spectral data in a timewise fashion.

Imaging system 140 or fringe processor 224 removes (415) the pathlength errors in the frequency domain representation to produce a corrected frequency domain representation. This removal can comprise subtracting the pathlength difference contributions to the phase of each spectral channel of the originally obtained interference fringe image in the frequency domain representation. This corrected frequency domain representation is then provided to an image processor that reconstructs an image from the frequency domain representation.

In FIG. 2, image reconstruction module 225 constructs (416) a corrected image of the scene or object from the corrected frequency domain representation. This corrected image can be transferred for viewing or storage as resultant images. Various image reconstruction techniques can be employed, such as gradient-based optimization, greedy methods, stochastic methods, or global search strategies. Many of these algorithms use priors or regularization to ensure the solution is consistent with both the measured data and an expectation of scene characteristics (e.g. smooth, nonnegative, compact). Because these algorithms are typically working with interferometric data that has missing or partial phase information, they can become quite complex and require expert knowledge for hyperparameter tuning. While the image reconstruction algorithms employed herein might share many properties (gradient-based optimization, use of priors with hyperparameters for tuning), these image reconstruction algorithms have a unique focus on systems designs that take advantage of additional phase information gained with multispectral measurements. This arrangement significantly reduces the complexity of any selected image reconstruction algorithm, provides for a faster run time, and establishes a higher likelihood to converge on a solution during image reconstruction.

Operations in FIG. 4 thus provide for a complete phase estimate. Other techniques, such as closure phase and baseline bootstrapping, only provides partial phase information. The closure phase technique also utilizes simultaneous collection in an attempt to combine and cancel pathlength errors and thus isolate target phases, whereas the linear-phase processing technique herein instead utilizes simultaneous collects to isolate pathlength errors for correction of target phases. Baseline bootstrapping still contains any phase errors in the measured data, but the operations in FIG. 4 can be used in conjunction with baseline bootstrapping to efficiently incorporate low signal/long baselines and also provide a more accurate phase estimate. By employing the weights noted above, a low signal baseline has a reduced effect on the end result because there are typically other more informative baselines that include the same optical collection device, but it need not be ignored entirely.

Advantageously, the enhanced techniques discussed herein solve for the N absolute path-length errors in each arm of an interferometer. The phase correction algorithms and techniques discussed herein employ specific design choices of an imaging interferometer. One design choice is to collect multispectral measurements, and another is to have subsets of collecting arms with all-on-all beam combination. The phase correction algorithms in the aforementioned fringe processing can include two complementary procedures. The first procedure is incorporated into the preliminary coherent integration by the fringe processor 224 to determine pathlength errors. The second procedure is performed by the image reconstruction module 225 after coherent integration for a second-pass cleanup that has access to more information such as data-driven estimates of fringe-processing noise and signal strength. This allows the overall fringe-processing algorithm to produce very well-corrected Fourier components that are adjusted prior to heading into image reconstruction. The procedures use the measured spectral phase data to cancel contributions from the scene. The remnant phase differences are unwrapped and converted to path length differences between any two arms of the interferometer. The differences are used with a weighted least-squares inversion to solve for the absolute path error in each arm of the interferometer and then apply the necessary post-processing calibration to the data.

Figure 7:
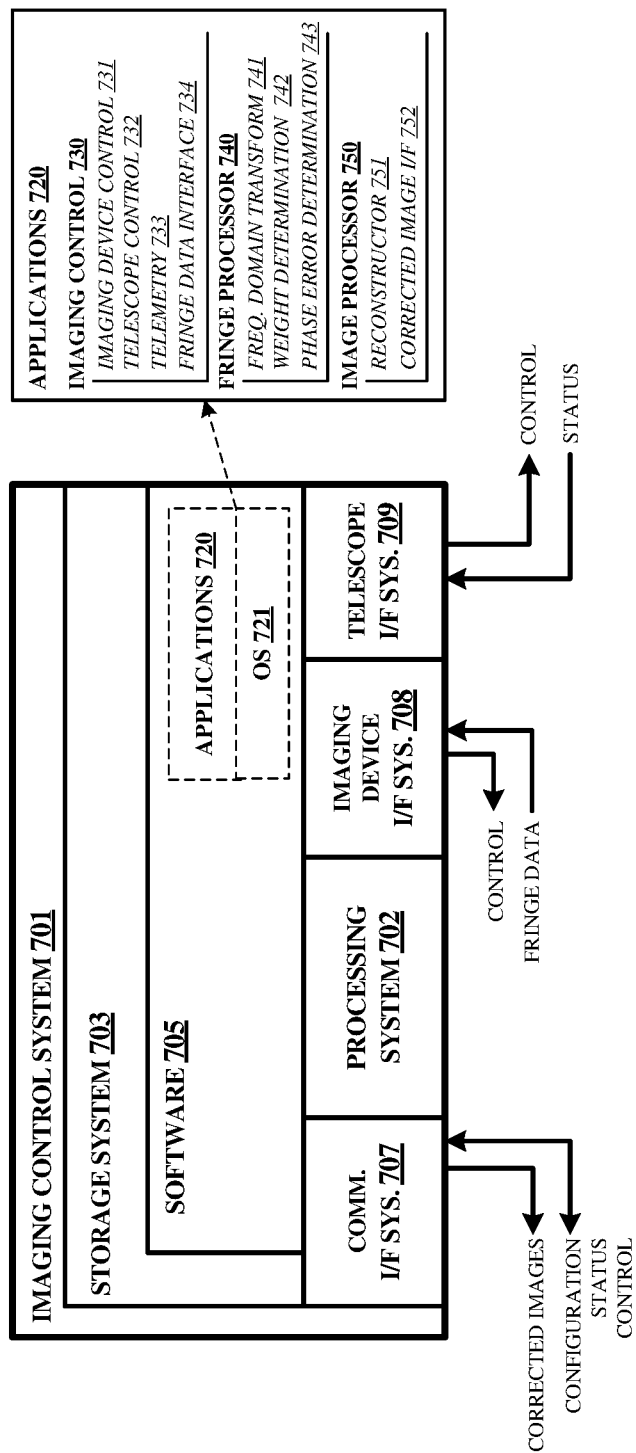
FIG. 7 illustrates an example imaging control system in an implementation.

FIG. 7 illustrates imaging control system 700 and associated software 705 in an implementation. Imaging control system 700 is representative of any system or collection of systems in which the various operational techniques, algorithms, architectures, scenarios, and processes disclosed herein may be implemented. For example, imaging control system 700 can be used to implement elements of imaging system 140 of FIG. 1, or imaging processor 223, fringe processor 224, and image reconstruction module 225 of FIG. 2. Imaging control system 700 can implement one or more portions of the operations found in FIG. 4.

Imaging control system 700 may be implemented as a single apparatus, system, or device or may be implemented in a distributed manner as multiple apparatuses, systems, or devices. Imaging control system 700 includes, but is not limited to, processing system 702, storage system 703, software 705, communication interface system 707, imaging device interface system 708, and telescope interface system 709. Processing system 702 is operatively coupled with storage system 703, communication interface system 707, imaging device interface system 708, and telescope interface system 709.

Processing system 702 loads and executes software 705 from storage system 703. Software 705 includes applications 720, at least some of which are representative of the operational techniques, algorithms, architectures, scenarios, and processes discussed with respect to the included Figures. When executed by processing system 702 to collect interference fringe images, process the interference fringe images in a frequency domain representation to determine pathlength errors associated with optical collection devices within an interferometry system, produce corrected frequency domain data, and reconstruct images from the corrected frequency domain data, among other services, software 705 directs processing system 702 to operate as described herein for at least the various processes, operational scenarios, and sequences discussed in the foregoing implementations. Imaging control system 700 may optionally include additional devices, features, or functionality not discussed for purposes of brevity.

Processing system 702 may comprise a microprocessor and processing circuitry that retrieves and executes software 705 from storage system 703. Processing system 702 may be implemented within a single processing device but may also be distributed across multiple processing devices or subsystems that cooperate in executing program instructions. Examples of processing system 702 include general purpose central processing units, application specific processors, graphics processing units, and logic devices, as well as any other type of processing device and supporting circuitry, combinations, or variations thereof.

Storage system 703 may comprise any tangible computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions comprising applications 720 and operating system 721 that provide control of an imaging system and interferometry system, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include applications 720. Software 705 may also comprise firmware or some other form of machine-readable processing instructions executable by processing system 702.

Software 705, when loaded into processing system 702 and executed, may transform a suitable apparatus, system, or device (of which imaging control system 700 is representative) overall from a general-purpose computing system into a special-purpose computing system customized to collect interference fringe images, process the interference fringe images in a frequency domain representation to determine pathlength errors associated with optical collection devices within an interferometry system, produce corrected frequency domain data, and reconstruct images from the corrected frequency domain data, among other services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors. For example, if the computer-readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 720 can include imaging control 730, fringe processor 740, and image processor 750. Imaging control 730 includes imaging device control 731, telescope control 732, telemetry element 733, and fringe data interface 734. Phase processor 740 includes frequency domain transform element 741, weight determination element 742, and phase error determination element 743. Image processor 750 includes image reconstructor 751, and corrected image interface 752.

Turning first to imaging system interface 730, imaging device control 731 controls and interfaces with one or more imaging sensor(s) configured to capture interference fringe images or data. Imaging device control 731 can determine when to capture interference fringe data, provide sampled preview images, and control any supporting circuitry or analog-to-digital circuitry associated with the imaging sensors. When a separate imaging device comprises the imaging sensor(s), then imaging device control 731 can interface with such device to capture interference fringe data. Imaging device control 731 can also determine status or states of various imaging related circuitry and beamline elements, such as to determine failures or status of beamlines, determine which beamlines are active during image capture, and monitor/maintain pixel operations state information for imaging sensors, among other operations. Telescope control 732 provides control of the various optical collection devices, which may include controlling orientation, pointing, tilt, motor elements, gyroscopic elements, lens/mirror elements, light sensing elements, pointing assistance elements, or other elements associated with the telescopes or other optical collection devices. Telemetry element 733 provides capture and storage of present states of various elements of an interferometry system, such as environmental or ambient conditions (weather, temperature, humidity, vibrational states), telescope pointing status, telescope operational health status, beamline operational status, or other telemetry. Fringe data interface 734 provide interference fringe data captured by an imaging sensor to phase processor 740, such as fringe images in various imaging formats, types, or data arrangements. The fringe image is formed by interfering multispectral optical signals collected by a set of telescopes.

Turning next to phase processor 740 frequency domain transform element 741 obtains multispectral interference fringe data in a spectral/spatial domain format and transforms or otherwise converts the fringe data into a frequency domain representation. The frequency domain representation comprises spectral channels corresponding to interfered combinations among the multispectral optical signals. This transformation can include a Fourier transform, Fast Fourier Transform (FFT), Fourier series, wavelet processing, or other pre-transform processing or post-transform processing. The output data from frequency domain transform element 741 is a frequency domain representation of the interference fringe data comprising phase and amplitude data. This phase and amplitude data can span a complex plane or be indicated in a complex/imaginary metric arrangement. Weight determination element 742 can be optionally employed to adjust corrections for various selected telescopes or telescope combinations using weight values. Telemetry can be employed to determine quality metrics of each telescope at a time of capture of the interference fringe data or surrounding time of capture, and quantitative weight values can then be assigned to the portion of the fringe data for each telescope based on the quality metrics. The weight values are determined based on characteristics selected among relative positioning of the optical collection devices, signal strengths associated with the multispectral optical signals, and noise levels associated with the multispectral optical signals, among other characteristics or metrics. Phase error determination element 743 then employs the interference fringe data in the frequency representation along with the weights to produce a corrected frequency domain representation using one or more mathematical operations. In one example, phase error determination element 743 determines pathlength errors of beam paths associated with the telescopes by concurrently processing the spectral channels of the frequency domain representation. Concurrently processing the spectral channels can include determining the pathlength errors relative to a nominal value by performing a least squares linear regression or nonlinear fit employing the spectral channels. Alternatively, the weight values can be employed in a weighted least squares linear regression or nonlinear fit to determine the pathlength errors relative to a nominal value. Phase error determination element 743 then removes the pathlength errors in the frequency domain representation from the original fringe data (in the frequency domain representation) to produce a corrected frequency domain representation. This corrected frequency domain representation is then provided to image processor 750.

Turning now to image processor 750, reconstructor 751 obtains corrected fringe data as a corrected frequency domain representation. Reconstructor 751 can transform the corrected frequency domain representation to a spectral/spatial domain representation. Reconstructor 751 employs various image reconstruction techniques that use fringe data (in a spectral/spatial domain or a frequency domain) to reproduce an image of a scene. Reconstructor 751 can optionally obtain telemetry to aid in reverse processing from a frequency domain to a spectral/spatial domain. Corrected image interface 752 then provides the reconstructed or reproduced image to an operator, user, or storage device for viewing or analysis. Corrected image interface 752 might convert a file format or color space of the reconstructed or reproduced image as needed for any destination user or system.

Communication interface system 707 may include communication connections and devices that allow for communication with other imaging systems, computing systems, or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 707 can receive configuration data or commands or receive interference fringe data for imaging device interface 708, and provide user commands, telescope control and imaging sensor device control for users or other operators. Communication interface system 707 may provide portions of imaging device interface system 708 or telescope interface system 709, such as physical link layer portions or other communication layer elements.

Imaging device interface system 708 comprises various hardware and software elements for interfacing with imaging sensors or imaging devices that incorporate imaging sensors. The imaging sensors produce an interference fringe image made by interfering multispectral optical signals of a scene supplied by optical collection devices. Telescope interface system 709 comprises various hardware and software elements for interfacing with optical collection devices, such as telescopes to control the operation of telescopes. Telescope interface system 709 typically does not comprise the optical beamlines or optical fiber interfaces of the telescopes, and instead corresponds to the control/command interfaces of the telescopes. However, preview or pointing assistance images might be obtained over telescope interface system 709. Imaging device interface system 708 and telescope interface system 709 may include various power supply or power control links.

Communication between imaging control system 700 and other elements or systems (not shown) via any of communication interface system 707, imaging device interface system 708, or telescope interface system 709, may occur over data links, control links, communication links, or communication networks and in accordance with various communication protocols, combinations of protocols, or variations thereof. For example, imaging control system 700 when implementing a control device, might communicate with imaging sensor elements or telescope devices over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example network topologies include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet Protocol (IP), the transmission control protocol (TCP), and the user datagram protocol (UDP), as well as any other suitable communication protocol, variation, or combination thereof.

Communication interface system 707 may include a software or virtual interface such as a terminal interface, command line interface, or application programming interface (API). Communication interface system 707 may also include physical user interfaces, such as keyboard, a mouse, a voice input device, or a touchscreen input device for receiving input from a user. Communication interface system 707 may include visualization/status interfaces, user command controls, and telemetry, such as user controls, start/stop controls, operating mode control interfaces, visualization interfaces, and system characteristic calibration controls, among others. Output devices such as displays, speakers, web interfaces, terminal interfaces, and other types of output devices may also be included in communication interface system 707. In network interface examples, communication interface system 707 might packetize data for receipt by a display system or computing system coupled over one or more network interfaces. Communication interface system 707 may comprise API elements for interfacing with users, other data systems, other user devices, web interfaces, and the like. Communication interface system 707 may also include associated user interface software executable by processing system 702 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
producing an interference fringe image by optically interfering multispectral optical signals of a scene supplied by optical collection devices, wherein first ones of the optical collection devices are configured to interfere more strongly than second ones of the optical collection devices to produce the interference fringe image;
transforming the interference fringe image into a frequency domain representation comprising spectral channels corresponding to interfered combinations among the multispectral optical signals;
determining pathlength errors of beam paths associated with the optical collection devices by concurrently processing the spectral channels of the frequency domain representation;
removing the pathlength errors in the frequency domain representation to produce a corrected frequency domain representation; and
constructing a corrected image of the scene from the corrected frequency domain representation.

2. The method of claim 1, further comprising:
concurrently processing the spectral channels to determine the pathlength errors relative to a nominal value by performing a least squares linear regression or nonlinear fit employing the spectral channels.

3. The method of claim 2, further comprising:
applying weight values to selected spectral channels in the least squares linear regression or nonlinear fit, wherein the weight values are determined based on characteristics selected among relative positioning of the optical collection devices, signal strengths associated with the multispectral optical signals, and noise levels associated with the multispectral optical signals.

4. An apparatus, comprising:
an imaging interface configured to obtain an interference fringe image by optically interfering multispectral optical signals of a scene supplied by optical collection devices, wherein first ones of the optical collection devices are configured to interfere more strongly than second ones of the optical collection devices to produce the interference fringe image; and
the imaging interface configured to transfer the interference fringe image to a fringe processor;
the fringe processor configured to:
transform the interference fringe image into a frequency domain representation comprising spectral channels corresponding to interfered combinations among the multispectral optical signals;
determine pathlength errors of beam paths associated with the optical collection devices by concurrently processing the spectral channels of the frequency domain representation; and
remove the pathlength errors in the frequency domain representation to produce a corrected frequency domain representation; and an image processor configured to construct a corrected image of the scene from the corrected frequency domain representation.

5. The apparatus of claim 4, comprising:
the fringe processor configured to concurrently process the spectral channels to determine the pathlength errors relative to a nominal value by performing a least squares linear regression or nonlinear fit employing the spectral channels.

6. The apparatus of claim 5, comprising:
the fringe processor configured to apply weight values to selected spectral channels in the least squares linear regression or nonlinear fit, wherein the weight values are determined based on characteristics selected among relative positioning of the optical collection devices, signal strengths associated with the multispectral optical signals, and noise levels associated with the multispectral optical signals.

7. A computing device; comprising:
one or more computer readable storage media;
program instructions stored on the one or more computer readable storage media, the program instructions executable by a processing system to direct the processing system to at least;
instruct an imaging interface to obtain an interference fringe image by optically interfering multispectral optical signals of a scene supplied by optical collection devices, wherein first ones of the optical collection devices are configured to interfere more strongly than second ones of the optical collection devices to produce the interference fringe image;
transform the interference fringe image into a frequency domain representation comprising spectral channels corresponding to interfered combinations among the multispectral optical signals;
determine pathlength errors of beam paths associated with the optical collection devices by concurrently processing the spectral channels of the frequency domain representation;
remove the pathlength errors in the frequency domain representation to produce a corrected frequency domain representation; and
construct a corrected image of the scene from the corrected frequency domain representation.

8. The software of claim 7, comprising further program instructions that, when executed by the computing device, direct the processing system to at least:
concurrently process the spectral channels to determine the pathlength errors relative to a nominal value by performing a least squares linear regression or nonlinear fit employing the spectral channels.

9. The software of claim 8, comprising further program instructions that, when executed by the computing device, direct the processing system to at least:
apply weight values to selected spectral channels in the least squares linear regression or nonlinear fit, wherein the weight values are determined based on characteristics selected among relative positioning of the optical collection devices, signal strengths associated with the multispectral optical signals, and noise levels associated with the multispectral optical signals.

* * * * *